United States Patent
Fujino et al.

(10) Patent No.: US 12,462,568 B2
(45) Date of Patent: Nov. 4, 2025

(54) MOVING IMAGE TRANSMISSION/RECEPTION SYSTEM, TRANSMISSION TERMINAL, PROGRAM, AND METHOD

(71) Applicants: FAIRY DEVICES Inc., Tokyo (JP); DAIKIN INDUSTRIES, LTD., Osaka (JP)

(72) Inventors: Masato Fujino, Tokyo (JP); Jun Kuchii, Tokyo (JP); Yuichiro Takezaki, Tokyo (JP); Taro Kataoka, Tokyo (JP)

(73) Assignees: FAIRY DEVICES Inc., Tokyo (JP); DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/861,340

(22) PCT Filed: May 26, 2023

(86) PCT No.: PCT/JP2023/019801
§ 371 (c)(1),
(2) Date: Feb. 27, 2025

(87) PCT Pub. No.: WO2023/234227
PCT Pub. Date: Dec. 7, 2023

(65) Prior Publication Data
US 2025/0200974 A1    Jun. 19, 2025

(30) Foreign Application Priority Data
May 31, 2022    (JP) ................................ 2022-089283

(51) Int. Cl.
*H04N 7/14*    (2006.01)
*G06T 7/00*    (2017.01)
(Continued)

(52) U.S. Cl.
CPC ............ *G06V 20/52* (2022.01); *G06T 7/0002* (2013.01); *G06V 10/25* (2022.01); *G06T 2207/20132* (2013.01)

(58) Field of Classification Search
CPC ...... G06V 20/52; G06V 10/25; G06T 7/0002; G06T 2207/20132; H04N 7/18
(Continued)

(56) References Cited

U.S. PATENT DOCUMENTS 9,699,518 B2 *   7/2017  Ohbitsu ............. H04N 21/2402
10,587,841 B1    3/2020  Nazuka et al.
(Continued)

FOREIGN PATENT DOCUMENTS

CN    110896446 A    3/2020
JP    H7-288806 A    10/1995
(Continued)

OTHER PUBLICATIONS

ISR for PCT/JP2023/019801, dated Jul. 18, 2023 (w/ translation).
(Continued)

*Primary Examiner* — Trang U Tran
(74) *Attorney, Agent, or Firm* — GREENBLUM & BERNSTEIN, P.L.C.

(57) ABSTRACT

A moving image transmission/reception system which includes a transmission terminal and a reception terminal connected to each other via a communication line, wherein the transmission terminal transmits, to the reception terminal, a moving image obtained by an imaging unit. The reception terminal designates a specific area of interest from the moving image received from the transmission terminal, and transmits information relating to the area of interest to the transmission terminal. Upon reception of the information relating to the area of interest from the reception terminal, the transmission terminal creates, on the basis of the infor-
(Continued)

mation relating to the area of interest, a corrected moving image having undergone a process of cutting out a moving image portion in the area of interest from an original moving image obtained by the imaging unit, or a process of degrading the quality of a moving image portion outside the area of interest as compared to the original moving image, and transmits the corrected moving image to the reception terminal.

4 Claims, 7 Drawing Sheets

(51) Int. Cl.
*G06V 10/25* (2022.01)
*G06V 20/52* (2022.01)

(58) Field of Classification Search
USPC .......................................................... 348/143
See application file for complete search history.

(56) References Cited

U.S. PATENT DOCUMENTS

| | | |
|---|---|---|
| 2005/0237380 A1 | 10/2005 | Kakii et al. |
| 2020/0151487 A1* | 5/2020 | Yonezawa ............ H04N 19/167 |
| 2024/0179097 A1* | 5/2024 | Kubo ..................... H04N 21/24 |

FOREIGN PATENT DOCUMENTS

| | | |
|---|---|---|
| JP | H9-186991 A | 7/1997 |
| JP | 2006-33506 A | 2/2006 |
| JP | 2006-101472 A | 4/2006 |

OTHER PUBLICATIONS

Notice of Reasons for Refusal for JP App. No. 2023-086793, dated Jul. 12, 2023 (w/ translation).
Notice of Reasons for Refusal for JP App. No. 2023-086793, dated Nov. 7, 2023 (w/ translation).
Decision to Grant a Patent for JP App. No. 2023-086793, dated Jan. 23, 2024 (w/ translation).
Office Action dated Mar. 4, 2025 issued in Chinese Patent Application No. 202380023244.9 along with Corresponding English translation.

* cited by examiner

MOVING IMAGE TRANSMISSION/RECEPTION SYSTEM, TRANSMISSION TERMINAL, PROGRAM, AND METHOD

TECHNICAL FIELD

The present invention relates to a system that transmits a moving image from a transmission terminal to a reception terminal over a communication link, the transmission terminal itself, a program for the transmission terminal, and a method for transmitting a moving image.

BACKGROUND ART

In recent years, digital transformation (DX) of field work has been an urgent issue to deal with various problems such as increasingly complicated field work, decrease in working population, and transfer of techniques possessed by skilled workers. As a solution to these problems, there is proposed a remote support system in which a wearable device worn by a worker on-site and a computer operated by a supporter are connected to one another over the Internet or the like to share voice information and visual information (Patent Literature 1).

In such a remote support system, the wearable device (a transmission terminal) uses a camera to obtain a moving image that captures surroundings of the worker and transmits the moving image to the computer (a reception terminal) operated by the supporter. In recent years, even small cameras have been made capable of obtaining a high-resolution, high-frame-rate moving image; however, in some cases, a moving image obtained by a camera of the transmission terminal cannot be transmitted as it is to the reception terminal because of a certain limitation of a bandwidth of a communication link connecting the transmission terminal and the reception terminal. In this case, the transmission terminal commonly transmits the moving image to the reception terminal after optimizing a quality of the moving image in accordance with the bandwidth of the communication link.

Here, Patent Literature 2 discloses a technique for reducing a data amount or bit rate of a moving image mainly for transferring the moving image by a surveillance camera. Specifically, in the invention according to Patent Literature 2, a specific region is set within a frame in the moving image by a user's designation, this specific region is transferred at a first frame rate, and a non-specific region, which is other than the specific region, is transferred at a second frame rate. Patent Literature 2 describes that this makes it possible to reduce a data amount or bit rate of the moving image efficiently while keeping a resolution of the specific region.

CITATION LIST

Patent Literature

Patent Literature 1: JP 7023022 B1
Patent Literature 2: JP 2021-13145 A

SUMMARY OF INVENTION

Technical Problem

In the invention according to Patent Literature 2, a surveillance camera itself capturing the moving image is provided with a setting unit that accepts designation of the specific region from the user. Therefore, according to the invention of Patent Literature 2, it is possible to set the specific region with the surveillance camera and transfer the specific region at a high frame rate within an electronic device or to an outside of the electronic device; however, Patent Literature 2 makes no assumption about, for example, transmitting the moving image captured by the surveillance camera to another remote computer or the like over the Internet.

At the same time, with consideration given to a remote support system mentioned above in which information is shared between a worker and a supporter, and with reference to the technique of Patent Literature 2, it is possible for the wearable device (the transmission terminal) to set a high frame rate for the specific region and set a low frame rate for the non-specific region, which is other than the specific region. However, in this case, the region for which the transmission terminal sets the high frame rate does not necessarily match a region on which the supporter at a remote location desires to focus. That is, there is a case where the worker wearing the wearable device is capturing an environment around the worker, while the supporter desires to observe some region in a moving image transmitted from the worker in a high quality (in a high resolution and/or at a high frame rate). In addition, the supporter also has a demand for observing some region in the moving image in a highest possible quality allowed within a bandwidth of a communication link connecting the transmission terminal and the reception terminal. As seen from the above, it is convenient to freely select, in the moving image transmitted from the transmission terminal, a region to be transmitted in the highest possible quality using the reception terminal operated by the supporter.

Hence, a principal object of the present invention is to make it possible, in a moving image transmission system including a transmission terminal and a reception terminal, to freely select, mainly with the reception terminal, a zone in a moving image that the transmission terminal transmits in a quality as high as its original quality.

Solution to Problem

A first aspect of the present invention relates to a moving image transmission system. The moving image transmission system according to the present invention includes a transmission terminal and a reception terminal that are connected to one another over a communication link. The transmission terminal and the reception terminal may be directly connected to one another by a wireless LAN or the like or may be connected to one another over the Internet or the like via an external cloud server that provides a video calling tool for a Web conversation or the like. The transmission terminal includes an image capture unit that obtains a moving image and a transmission unit that transmits this moving image to the reception terminal. The moving image that is transmitted at this time may be of a quality that is lowered in accordance with a bandwidth of the communication link. Both or any one of the transmission terminal and the reception terminal includes a region-of-interest designation unit that designates a specific region of interest in this moving image. In particular, the reception terminal preferably includes a reception unit that receives the moving image from the transmission terminal, a region-of-interest designation unit that designates a specific region of interest in the moving image, and a transmission unit that transmits information about the region of interest to the transmission terminal. In this case, the transmission terminal is only required to include a reception unit that receives information about the region of interest from the reception terminal. As the designation of the region of interest, for example, a region of an arbitrary shape such as a rectangle or circle may be designated in the moving image, or a specific object included in the moving image may be designated. The transmission terminal further includes an image processing unit that modifies the moving image based on this information about the region of interest. Specifically, this image processing unit performs, based on the information about the region of interest, a process of cutting out a moving image in the region of interest from a raw moving image obtained by the image capture unit or a process of lowering a quality of a moving image in a region other than the region of interest from a quality of the raw moving image. An image obtained by performing any one of these processes on the raw moving image obtained by the image capture unit will be herein referred to as a "modified moving image." Herein, a "quality" of a moving image is a concept that includes both a resolution and frame rate of the moving image. That is, the process of lowering the quality of the moving image includes both or any one of a process of lowering a resolution of the moving image and a process of lowering a frame rate of the moving image. The transmission terminal transmits the modified moving image obtained in this manner to the reception terminal through the transmission unit.

Like the above configuration, by making it possible to designate, mainly with the reception terminal, a specific region of interest in a moving image transmitted from the transmission terminal, for example, it is possible for a supporter who remotely supports a worker on-site to freely designate a region to focus on in an environment around the worker. In the present invention, it is preferable for the transmission terminal to perform image processing in accordance with a region of interest designated by the reception terminal, rather than the reception terminal performing image processing on a moving image transmitted from the transmission terminal. This makes the moving image transmitted from the transmission terminal to the reception terminal have a region other than the region of interest deleted or have a data amount reduced by lowering its quality, and thus it is possible to transmit data on the moving image efficiently even with a limited communication band.

In the system according to the present invention, both or any one of the transmission terminal and the reception terminal preferably further includes a bandwidth measurement unit that measures a bandwidth of the communication link. Note that the "bandwidth" is a maximum amount of data that can be transmitted or received per unit time, and is also referred to as a channel capacity. In this case, the image processing unit of the transmission terminal creates the modified image in accordance with the bandwidth of the communication link. Specifically, when the image processing unit performs a process of cutting out the moving image in the region of interest from the raw moving image, the image processing unit can adjust a zone in the moving image to cut out and adjust a quality of the moving image cut out here in accordance with the bandwidth of the communication link. When the image processing unit performs the process of lowering the quality of the moving image in the region other than the region of interest from the quality of the raw moving image, the image processing unit can adjust a degree of lowering the quality in accordance with the bandwidth of the communication link. This makes it possible to transmit, while measuring the bandwidth of the communication link in real time, the moving image in the region of interest to the reception terminal, making full use of the bandwidth.

In the system according to the present invention, the reception terminal preferably further includes a support unit. This support unit provides a user interface (UI) that supports designation of the region of interest in accordance with the bandwidth of the communication link. For example, when the moving image in the region of interest is to be cut out, the support unit can display a frame enclosing a maximum area within which the transmission in an original quality of the raw moving image is allowed, in accordance with the bandwidth of the communication link, and then let the user select, in the frame, a portion to be cut out as the region of interest. When the quality of the moving image in the region other than the region of interest is to be lowered, for example, the support unit can display the frame enclosing the maximum area within which the transmission in the original quality of the raw moving image is allowed, in accordance with the bandwidth of the communication link, and then let an operator of the reception terminal select, in the frame, a portion to be specified as the region of interest. As seen from the above, in a case where the maximum area within which the transmission in the original quality of the raw moving image is allowed changes in accordance with the bandwidth of the communication link, presenting the maximum area to the operator of the reception terminal with the UI as described above makes it easy for the operator to designate the region of interest.

A second aspect of the present invention relates to a program for a transmission terminal. The program according to the present invention causes a personal digital assistant (PDA) including an image capture unit (a camera) to function as the transmission terminal in the system according to the first aspect. Such a program may be downloadable to the personal digital assistant over the Internet, may be pre-installed on the personal digital assistant, or may be stored in a recording medium readable by the personal digital assistant, such as a CD-ROM.

A third aspect of the present invention relates to a transmission terminal for a moving image. The transmission terminal according to the present invention is connected to a reception terminal over a communication link. The transmission terminal includes an image capture unit, a transmission unit, a reception unit, and an image processing unit. The image capture unit obtains a moving image. The transmission unit transmits the moving image to the reception device. The reception unit receives, from the reception terminal, information about a specific region of interest designated in the moving image. Alternatively, the transmission terminal may include, instead of this reception unit, a region-of-interest designation unit that designates a specific region of interest in the moving image. The image processing unit creates a modified moving image that is obtained by performing, based on the information about the region of interest, a process of cutting out a moving image in the region of interest from a raw moving image obtained by the image capture unit or a process of lowering a quality of a moving image in a region other than the region of interest from a quality of the raw moving image. The transmission unit further transmits the modified moving image to the reception terminal.

A fourth aspect of the present invention relates to a method for transmitting a moving image from a transmission terminal to a reception terminal over a communication link. In the method according to the present invention, first, the transmission terminal obtains a moving image and transmits this moving image to the reception terminal (a first step). Next, the transmission terminal or the reception terminal designates a specific region of interest in the moving image (a second step). Next, the transmission terminal creates a modified moving image that is obtained by performing, based on the information about the region of interest, a process of cutting out a moving image in the region of interest from a raw moving image obtained by the image capture unit or a process of lowering a quality of a moving image in a region other than the region of interest from a quality of the raw moving image, and transmits this modified moving image to the reception terminal (a third step).

Advantageous Effects of Invention

According to the present invention, it is possible to freely select, mainly with the reception terminal, a zone in a moving image that the transmission terminal transmits in a quality as high as its original quality.

DESCRIPTION OF EMBODIMENTS

An embodiment for practicing the present invention will be described below with reference to the drawings. The present invention is not limited to the embodiment described below but includes modifications that are made by those skilled in the art as appropriate within a scope obvious to those skilled in the art from the following embodiment.

Figure 1:
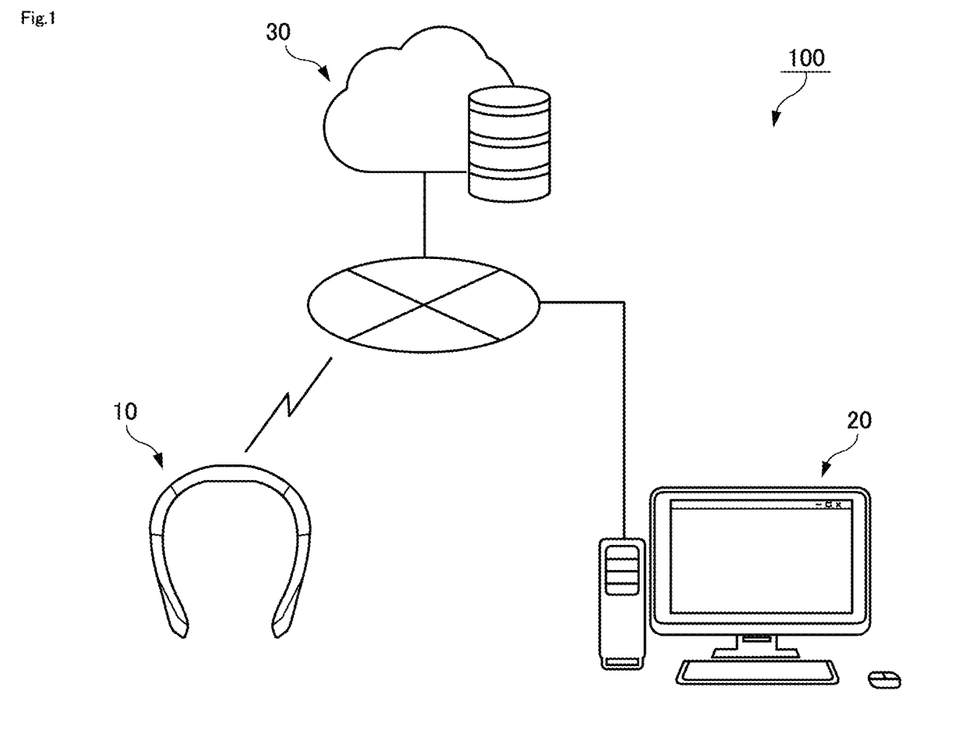
FIG. 1 illustrates a general view of a system according to an embodiment of the present invention.

FIG. 1 schematically illustrates a general configuration of a system 100 according to an embodiment of the present invention. The system 100 according to the present embodiment is suitably used in a use in which a supporter remotely supports, over the Internet, a worker who performs work on-site. In this system 100, with a transmission terminal 10, the worker captures a moving image and transmits this moving image over the Internet to a reception terminal 20 that is operated by the supporter. With the reception terminal 20, the supporter at a remote location can browse the moving image transmitted from the transmission terminal 10 of the worker and also exchange voices with this transmission terminal 10. The system 100 may include an external cloud server 30 that provides the transmission terminal 10 and the reception terminal 20 with a video calling tool. In this case, the moving image is transmitted from the transmission terminal 10 to the reception terminal 20 via this cloud server 30.

Figure 2:
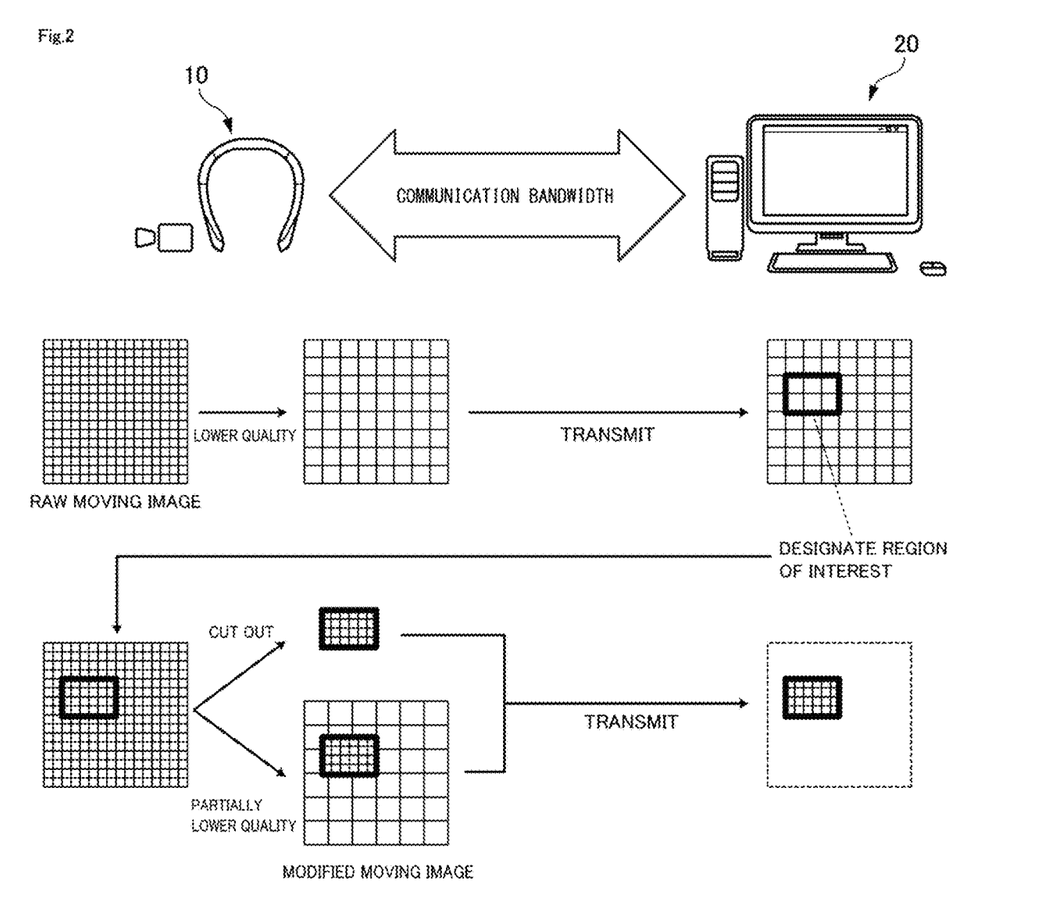
FIG. 2 illustrates an overview of information processing by the system according to the embodiment of the present invention.

FIG. 2 illustrates an overview of the system 100 according to the present invention. As illustrated in FIG. 2, the transmission terminal 10 and the reception terminal 20 are connected to one another by a communication link such as the Internet, and a bandwidth of this communication link has a certain limitation. Therefore, even when the transmission terminal 10 obtains a raw moving image of a high quality (a high resolution and a high frame rate), it is not possible to transmit the raw moving image to the reception terminal 20 in an original quality of the raw moving image as obtained when a data amount of this raw moving image per unit time exceeds the bandwidth of the communication link. Therefore, the transmission terminal 10 lowers a quality of the entire raw moving image in accordance with the bandwidth of the communication link before transmitting the raw moving image to the reception terminal 20. Examples of a process of lowering the quality of the raw moving image include lowering a screen resolution (an image quality) of the moving image and lowering a frame rate of the moving image. The reception terminal 20 receives the moving image of a quality lowered by the transmission terminal 10 and displays this moving image on a display unit in real time.

Here, the supporter who operates the reception terminal 20 may desire to browse a part of the moving image received from the transmission terminal 10 in a higher quality. For example, when the transmission terminal 10 obtains a moving image in a relatively wide range in front of the worker on-site and transmits the moving image to the reception terminal 20, the supporter may desire to discern small letters seen in the moving image or check in detail equipment operated by the worker. In this case, the supporter designates a region of interest in the moving image by operating the reception terminal 20. For example, as illustrated in FIG. 2, the supporter can designate, as the region of interest, a partial rectangular region in the moving image displayed on a screen. Information about the region of interest designated with the reception terminal 20 is transmitted to the transmission terminal 10 over the Internet.

Receiving the information about the region of interest from the reception terminal 20, the transmission terminal 10 performs image processing on the raw moving image based on this information. Specifically, the transmission terminal 10 cuts out only a zone designated with the reception terminal 20 as the region of interest from the raw moving image, and then maintains a quality of the cut-out portion in the original quality of the raw moving image while deleting data on the moving image other than the zone designated as the region of interest. Alternatively, the transmission terminal 10 maintains a quality of the zone designated in the raw moving image with the reception terminal 20 as the region of interest at the original quality of the raw moving image while lowering a quality of the moving image other than the zone designated as the region of interest. In this manner, the transmission terminal 10 creates a modified moving image in which the quality of the portion designated as the region of interest is maintained at the quality of the raw moving image while data on the moving image other than the portion is deleted or lowered in quality in such a manner as to fit a data amount of this modified moving image per unit time within the bandwidth of the communication link, and then the transmission terminal 10 transmits the modified moving image to the reception terminal 20. This enables the reception terminal 20 to display the portion designated as the region of interest in the original quality of the raw moving image obtained by the transmission terminal 10.

Figure 3:
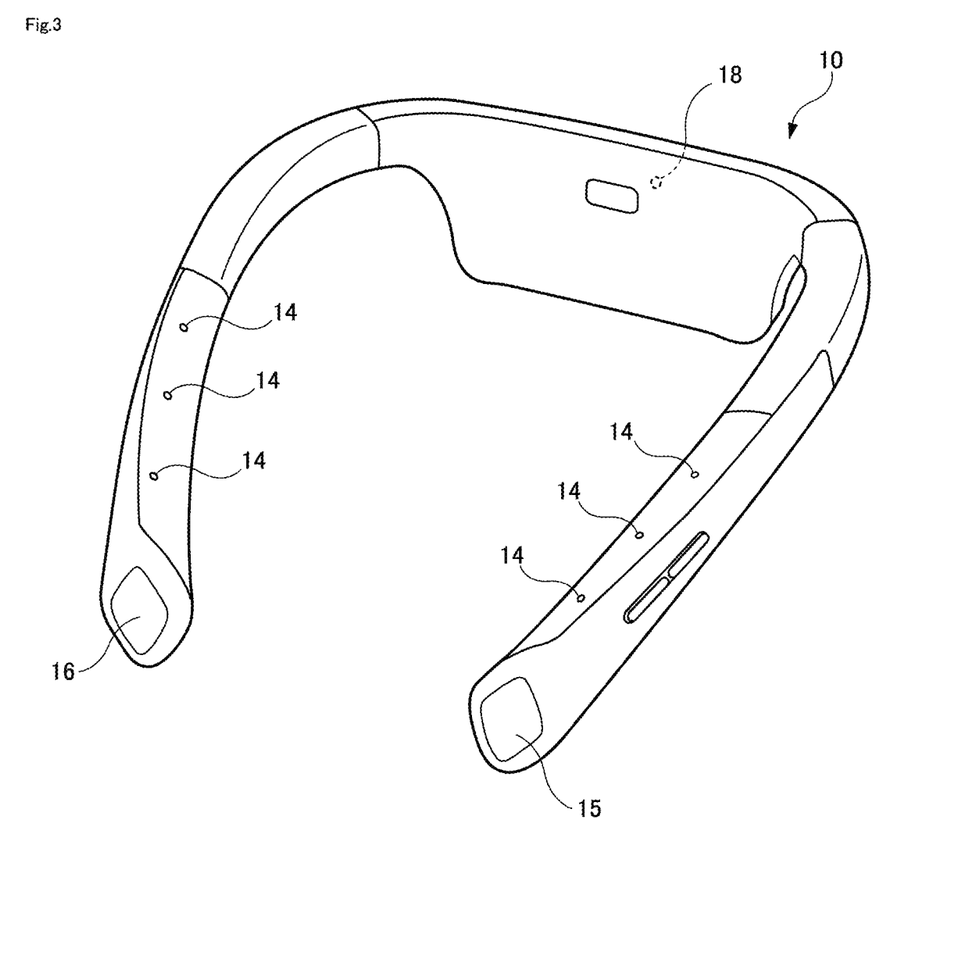
FIG. 3 illustrates a neck-worn wearable device as an example of a transmission terminal.
Figure 4:
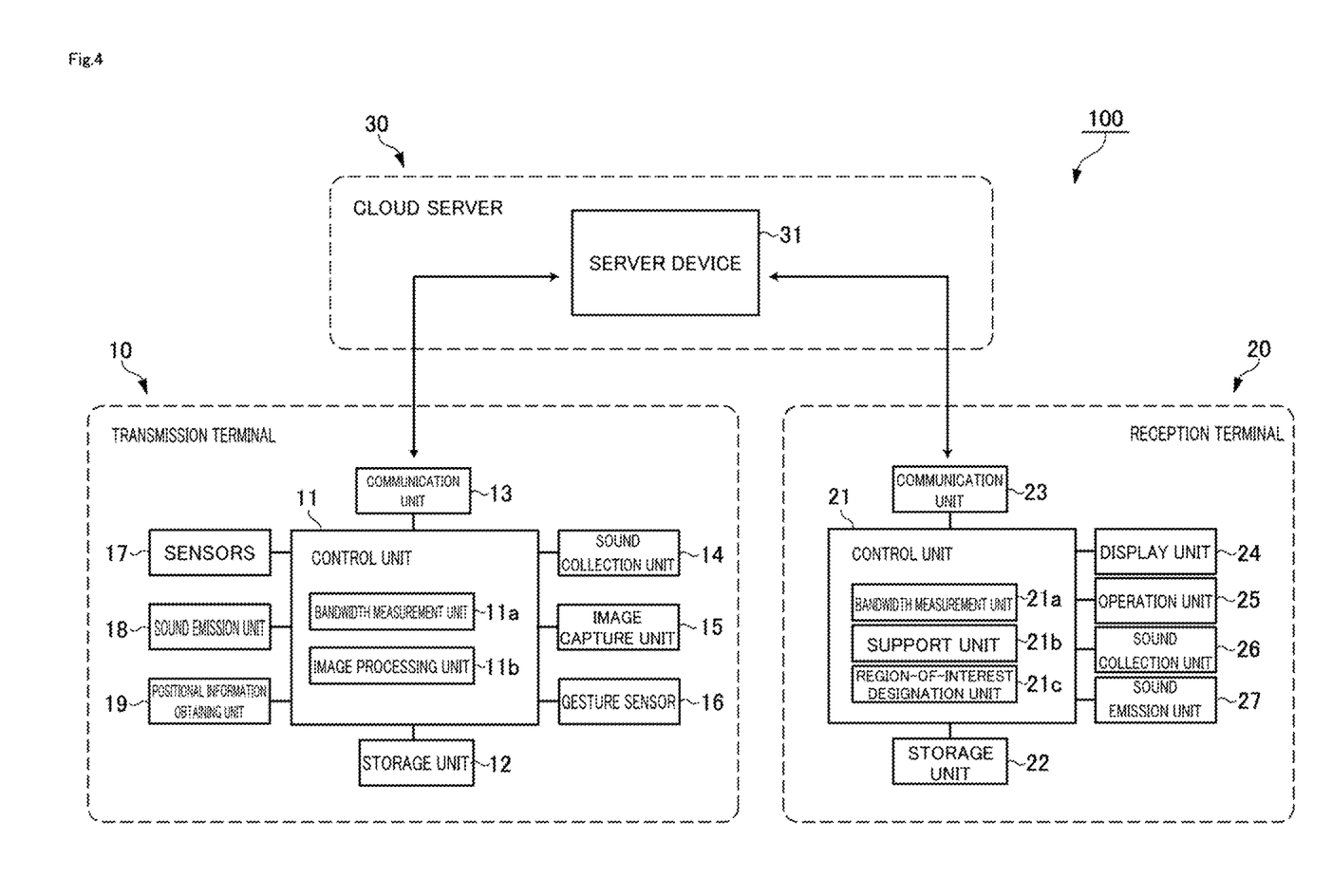
FIG. 4 is a block diagram illustrating a functional configuration of the system according to the embodiment of the present invention.

Subsequently, a more specific configuration of the system 100 according to the embodiment of the present invention will be described. FIG. 3 is an external perspective view illustrating an example of the transmission terminal 10. FIG. 4 illustrates an example of hardware elements of the transmission terminal 10. As illustrated in FIG. 3, the transmission terminal 10 in the present embodiment is a neck-worn wearable device. The transmission terminal 10 includes a left arm portion, a right arm portion, and a body portion that connects the left arm portion and the right arm portion at the back of the neck of a wearer. When the transmission terminal 10 is worn, it will suffice that the entire device is suspended on a neck such that the body portion is in contact with the back of the neck of the wearer, with the left arm portion and the right arm portion hanging down from sides of the neck of the wearer toward a chest. In a housing of the transmission terminal 10, various electronic components are housed.

The left arm portion and the right arm portion are each provided with a plurality of sound collection units 14 (microphones). The sound collection units 14 are disposed mainly for obtaining sound around the wearer and voice of the wearer and an interlocutor. To cover a wide area to collect sound produced around the wearer, omnidirectional microphones are preferably adopted as the sound collection units 14. As the sound collection units 14, known microphones such as dynamic microphones, capacitor microphones, or micro-electrical-mechanical systems (MEMS) microphones can be adopted. Each sound collection unit 14 converts sound into an electric signal, amplifies the electric signal with an amplifier circuit, then converts the amplified electric signal into digital information with an A/D converter circuit, and outputs the digital information to a control unit 11. A sound signal obtained by the sound collection unit 14 is transferred to the control unit 11 provided in the housing. In the present embodiment, the sound signal obtained by the sound collection unit 14 can be transmitted to the reception terminal 20 through a communication unit 13 over the Internet. This causes sound obtained by the worker on-site with the transmission terminal 10 to be shared with the reception terminal 20 of the supporter at a remote location.

The left arm portion is further provided with an image capture unit 15. Specifically, the image capture unit 15 is provided on a tip end surface of the left arm portion, and this image capture unit 15 can capture a moving image of a scene in front of the wearer. The image capture unit 15 may be also capable of capturing a still image. The moving image and the still image (hereinafter, collectively referred to as an "image") obtained by the image capture unit 15 are transferred to the control unit 11 in the housing and stored as image data. As the image capture unit 15, a common digital camera can be adopted. The image capture unit 15 includes, for example, an image capturing lens, a mechanical shutter, a shutter driver, a photoelectric transducer such as a CCD image sensor unit, a digital signal processor (DSP) that reads amounts of electric charge from the photoelectric transducer and generates image data, and an IC memory. The image data obtained by the image capture unit 15 is supplied to the control unit 11 and stored in a storage unit 12. The image capture unit 15 may be configured to subject the image data to a predetermined image analyzing process. The moving image and the still image obtained by the image capture unit 15 are also transmitted to the reception terminal 20 through the communication unit 13 over the Internet. This causes the moving image and the still image obtained by the worker on-site with the transmission terminal 10 to be shared with the reception terminal 20 of the supporter at the remote location.

The right arm portion is further provided with a gesture sensor 16 of a contactless type. The gesture sensor 16 is disposed on a tip end surface of the right arm portion mainly for detecting movement of a hand or hands of the wearer in front of the transmission terminal 10. The gesture sensor 16 detects, for example, an action or a shape of a finger or fingers of the wearer. The gesture sensor 16 is, for example, an optical sensor, and the gesture sensor detects an action or a shape of a target object by directing light from an infrared LED toward the target object and capturing changes in its reflected light with a light receiving device. Detection information from the gesture sensor 16 is transferred to the control unit 11 and used mainly to control the image capture unit 15 and a sound emission unit 18. Specifically, the detection information from the gesture sensor 16 is used to perform controlling of the image capture unit 15 and the sound emission unit 18 such as activating and stopping of the image capture unit 15 and the sound emission unit 18. For example, the gesture sensor 16 may be configured to control the image capture unit 15 upon detecting that an object such as a hand of the wearer has approached the gesture sensor 16 or may be configured to control the image capture unit 15 upon detecting that the wearer performs a predetermined gesture within a detection range of the gesture sensor 16. Note that positions of the image capture unit 15 and the gesture sensor 16 can be switched. Alternatively, the gesture sensor 16 may be replaced with a proximity sensor. The proximity sensor detects that, for example, a finger or fingers of the wearer has approached or entered a predetermined range. As the proximity sensor, a known proximity sensor such as an optical, ultrasonic, magnetic, capacitive, or thermal proximity sensor can be adopted.

The body portion, which is located on the back of the neck of the wearer, is provided with the sound emission unit (speaker) 18 on an outer side of the body portion (on an opposite side to the wearer). In the present embodiment, the sound emission unit 18 is disposed in such a manner as to output sound outward of the body portion. Emitting sound backward from the back of the neck of the wearer in this manner makes it difficult for the sound output from this sound emission unit 18 to directly reach an interlocutor present forward of the front of the wearer. This makes it easy for the interlocutor to distinguish between voice uttered by the wearer and sound emitted from the sound emission unit 18 of the transmission terminal 10. The sound emission unit 18 is an acoustic device that converts an electric signal into physical vibrations (i.e., sound). The sound emission unit 18 is, for example, a common speaker that transfers sound to the wearer through aerial vibrations. The sound emission unit 18 may be a bone conduction speaker that transfers sound to the wearer by vibrating a bone of the wearer. In this case, the sound emission unit 18 only has to be provided on an inner side (on the wearer side) of the body portion and configured such that the bone conduction speaker comes into contact with a bone of the back of the neck of the wearer (a cervical vertebra). In the present embodiment, a voice signal input into the reception terminal 20 is transmitted to the transmission terminal 10 over the Internet. The transmission terminal 10 uses the sound emission unit 18 to convert the voice signal received from the reception terminal 20 into sound and output the sound. This enables voice of the supporter operating the reception terminal 20 to be delivered to the worker wearing the transmission terminal 10.

As illustrated in FIG. 4, the control unit 11 of the transmission terminal 10 performs a computing process to control other elements included in the transmission terminal 10. As the control unit 11, a processor such as a central processing unit (CPU) or a graphics processing unit (GPU) can be used. Basically, the control unit 11 reads programs stored in the storage unit 12, develops the programs onto a main memory, and executes a predetermined computing process according to these programs. The control unit 11 can also write and read a result of computation according to the programs to and from the storage unit 12 as appropriate.

The control unit 11 of the transmission terminal 10 includes, as functional blocks, a bandwidth measurement unit 11a and an image processing unit 11b. These functional blocks 11a and 11b are implemented by the control unit 11 executing predetermined programs.

The bandwidth measurement unit 11a measures a bandwidth of the communication link that is used for the connection to the reception terminal 20. As mentioned above, the transmission terminal 10 is configured to transmit mainly a moving image to the reception terminal 20, and the bandwidth measurement unit 11a can measure a bandwidth of a communication link for the transmission (upstream) while this moving image is transmitted. To measure the bandwidth, a known method can be used. For example, the bandwidth measurement unit 11a of the transmission terminal 10 repeats a process of transmitting packets of test data to the reception terminal 20 while gradually shortening intervals of transmitting the packets. The bandwidth measurement unit 11a can calculate a transmission rate (amount of the data/time taken to transmit the data) at a time point when loss of a packet of the test data occurs, as an available bandwidth at the time point. In addition, when a packet loss occurs while data on a moving image is transmitted to the reception terminal 20 at a predetermined transmission rate, the bandwidth measurement unit 11a can also determine that the transmission rate is to be decreased because the moving image cannot be transmitted at the transmission rate.

The image processing unit 11b performs predetermined image processing on a raw moving image obtained by the image capture unit 15. For example, based on the bandwidth of the communication link measured by the bandwidth measurement unit 11a, the image processing unit 11b optimizes a quality (a resolution and/or a frame rate) of the entire raw moving image obtained by the image capture unit 15 so that the moving image can be transmitted to the reception terminal 20 within this bandwidth. In addition, based on a region of interest designated with the reception terminal 20, the image processing unit 11b creates a modified moving image by cutting out a portion corresponding to the region of interest from the raw moving image obtained by the image capture unit 15 or lowering a quality of a region other than the region of interest.

The storage unit 12 of the transmission terminal 10 is an element for storing information to be used in the computing process and the like by the control unit 11 and storing a result of the computation. A storage function of the storage unit 12 can be implemented by, for example, a nonvolatile memory such as an HDD or an SSD. The storage unit 12 may have a function as a main memory for writing or reading an interim result and the like of the computing process by the control unit 11. A memory function of the storage unit 12 can be implemented by a volatile memory such as a RAM or a DRAM. The storage unit 12 may store ID information that is unique to a user who possesses the transmission terminal 10. The storage unit 12 may store an IP address that is identification information on the transmission terminal 10 on the network.

The communication unit 13 of the transmission terminal 10 is an element for wirelessly communicating with the reception terminal 20 and the cloud server 30. For the communication unit 13, a communication module for performing the wireless communication according to, for example, a known mobile communication standard such as 3G (W-CDMA), 4G (LTE/LTE-Advanced), or 5G, or a wireless LAN system such as Wi-Fi (registered trademark) can be adopted to perform communication with the reception terminal 20 and the cloud server 30 via the Internet. The transmission terminal 10 can also communicate with another transmission terminal 10. In this case, for the communication unit 13, a communication module for short-range wireless communication of a system such as Bluetooth (registered trademark) or NFC is preferably adopted to directly communicate with the other transmission terminal 10.

Sensors 17 of the transmission terminal 10 include sensor devices that detect, for example, behavior and a usage situation of the transmission terminal 10 or biological information on a wearer of the transmission terminal 10. As the sensors 17, sensor modules that are installed in a common personal digital assistant or a wearable device can be adopted. For example, the sensors 17 include a gyro sensor, an acceleration sensor, a geomagnetic sensor, and a battery sensor. The sensors 17 may also include biological information sensors that detect the biological information on the wearer, such as a body temperature sensor, a heartbeat sensor, a blood oxygenation sensor, a blood pressure sensor, and an electrocardiography sensor.

A positional information obtaining unit 19 of the transmission terminal 10 is an element for obtaining information on a current position of the transmission terminal 10. Specifically, the positional information obtaining unit 19 has a function of performing positioning using the global positioning system (GPS). The positional information obtaining unit 19 measures times taken to receive radio waves transmitted from a plurality of GPS satellites based on information on time points of transmitting the radio waves included in the radio waves and transfers time information indicating the times to the control unit 11. Based on the obtained time information, the control unit 11 can calculate information about a latitude and a longitude of a present position of the transmission terminal 10. The positional information obtaining unit 19 may obtain the information on the current position by scanning a radio wave or a beacon signal sent from a wireless base station such as a Wi-Fi (registered trademark) access point.

As is clear from FIG. 3 and FIG. 4, in the present embodiment, the transmission terminal 10 includes no display device such as a display or a monitor. Therefore, although the worker can perform a relatively easy operation such as turning on or off each hardware element using the gesture sensor 16 and the like, it is difficult for the worker to perform a complex operation such as operating an application program. In a case where such a transmission terminal 10 including no display device is used, it is particularly effective to remotely control the transmission terminal 10 with the reception terminal 20 or the like over the Internet, as in the system according to the present invention.

FIG. 4 further illustrates an example of hardware elements of the reception terminal 20. The reception terminal 20 can be implemented by a common personal computer (PC). The reception terminal 20 may be any one of a desktop PC and a laptop PC. Alternatively, the reception terminal 20 may be a smartphone or a tablet computer. The reception terminal 20 includes a control unit 21, a storage unit 22, a communication unit 23, a display unit 24, an operation unit 25, a sound collection unit 26, and a sound emission unit 27. As these elements, a common PC and peripheral devices used with the PC can be used.

The control unit 21 of the reception terminal 20 includes a processor such as a CPU or a GPU. Basically, the control unit 21 reads programs stored in the storage unit 22, develops the programs onto a main memory, and executes a predetermined computing process according to these programs. The control unit 11 can also write and read a result of computation according to the programs to and from the storage unit 12 as appropriate. In this manner, the control unit 21 performs control processes on the elements 22 to 27 according to the programs stored in the storage unit 22.

The control unit 21 of the reception terminal 20 includes, as functional blocks, a bandwidth measurement unit 21a, a support unit 21b, and a region-of-interest designation unit 21c. These functional blocks 21a to 21c are implemented by the control unit 21 executing predetermined programs.

The bandwidth measurement unit 21a measures a bandwidth of the communication link that is used for the connection to the transmission terminal 10. The reception terminal 20 is configured to receive mainly a moving image from the transmission terminal 10, and the bandwidth measurement unit 21a can measure a bandwidth of a communication link for the reception (downstream) while this moving image is received. To measure the bandwidth, a known method can be used. For example, the bandwidth measurement unit 21a of the reception terminal 20 repeats a process of receiving packets of test data from the transmission terminal 10 while gradually shortening intervals of receiving the packets. The bandwidth measurement unit 21a can calculate a reception rate (amount of the data/time taken to receive the data) at a time point when loss of a packet of the test data occurs, as an available bandwidth at the time point. In addition, when a packet loss occurs while data on a moving image is received from the transmission terminal 10 at a predetermined reception rate, the bandwidth measurement unit 21a can also determine that the reception rate is to be decreased because the moving image cannot be transmitted at the reception rate.

Figure 5:
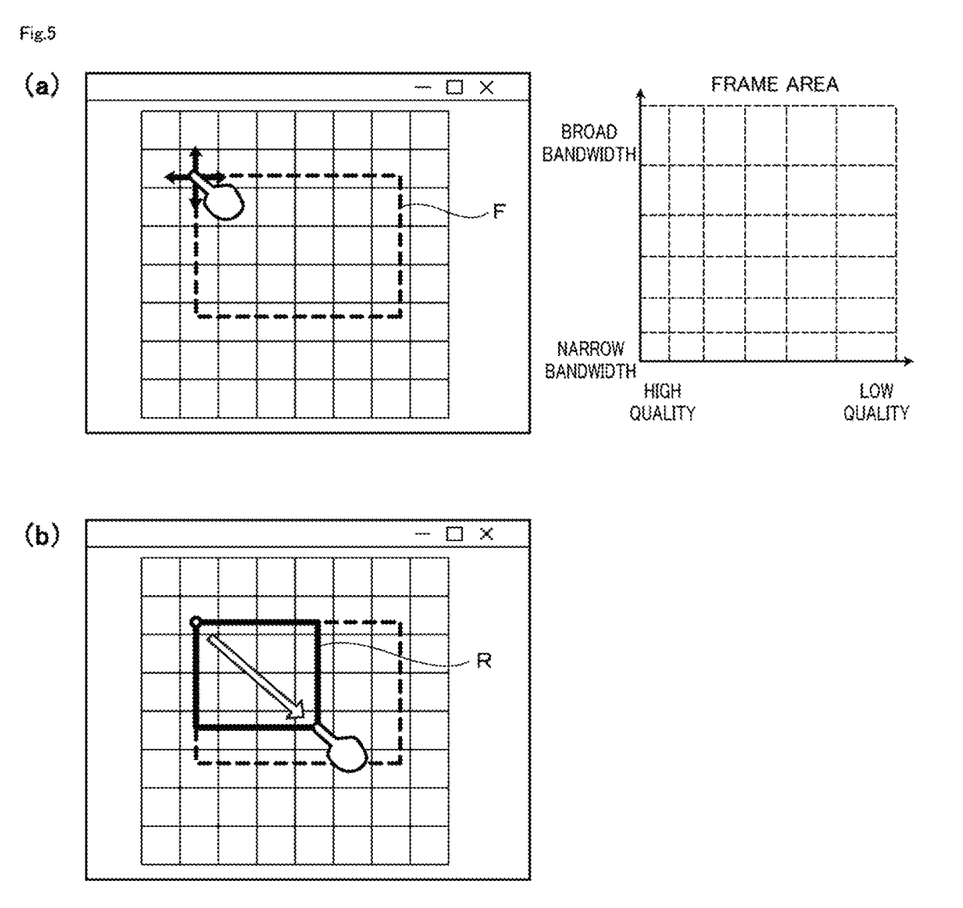
FIG. 5 illustrates an example of a user interface for support provided by a reception terminal.

The support unit 21b provides a UI for supporting designation of a region of interest in accordance with the bandwidth of the communication link measured by the bandwidth measurement unit 21a. FIG. 5(a) illustrates an example of the UI for support. In the example illustrated in FIG. 5(a), the support unit 21b displays, in accordance with a quality of a raw moving image transmitted from the transmission terminal 10 and the bandwidth of the communication link (particularly, a downlink), a frame F representing a maximum area that can be transmitted in an original quality of the raw moving image, on a display screen of the display unit 24. That is, an area of this frame F increases and decreases in accordance with the quality of the raw moving image and the band of the communication link. For example, the higher a quality (an image quality, a frame rate) of a raw moving image obtained by the transmission terminal 10 with the image capture unit 15, the larger a data amount of the raw moving image per unit area, the narrower a zone that can be transmitted to the reception terminal 20 in an original quality of the raw moving image over the communication link, and thus the smaller the area of the frame F. Conversely, the lower the quality of the raw moving image obtained by the transmission terminal 10 with the image capture unit 15, the larger the area of the frame F. At the same time, the narrower the bandwidth of the communication link, the smaller a data capacity per unit time in which the raw moving image obtained by the transmission terminal 10 with the image capture unit 15 can be transmitted over the communication link, and thus the smaller the area of the frame F. Conversely, the wider the bandwidth of the communication link, the larger the area of the frame F. In this manner, the support unit 21b can calculate, in accordance with the quality of the raw moving image transmitted from the transmission terminal 10 and the bandwidth of the communication link, the maximum area within which the transmission in the original quality of the raw moving image is allowed and can display the frame F based on the area on the display unit 24.

As illustrated in FIG. 5(a), after the area of the frame F is determined, this frame F can be freely moved on the display screen of the moving image. Operation of moving the frame F can be performed with the operation unit 25 of the reception terminal 20. As long as the area of the frame F is constant, a shape of the frame F can be freely changed to some extent within a range of the display screen of the moving image. The frame F illustrated in FIG. 5(a) has a horizontally long rectangular shape, and the frame F can be made square, vertically long, or further horizontally longer. The shape of the frame F is not limited to a rectangular shape and can be made circular or elliptic.

The region-of-interest designation unit 21c accepts, from a user of the reception terminal 20 (the supporter), designation of a specific region of interest in the moving image received from the transmission terminal 10. In the present embodiment, as mentioned above, the support unit 21b displays, on the display screen, the frame F representing the maximum area within which the transmission in the original quality of the raw moving image is allowed. In this case, the region-of-interest designation unit 21c accepts the designation of the specific region of interest within the range of the frame F from the user. To be specific, as illustrated in FIG. 5(a), the user operates the operation unit 25 to determine a position and the shape of the frame F on the display screen. Next, as illustrated in FIG. 5(b), when the position and the shape of the frame F are fixed, the user operates the operation unit 25 to designate a region of interest R within the range of the frame F. This region of interest F is configured not to protrude from the frame F. Note that the frame F and the region of interest R may coincide with one another. The region-of-interest designation unit 21c temporarily stores, in the storage unit 22, information about the region of interest R designated by the user in this manner. As the information about the region of interest R, in a case where, for example, the region of interest R has a rectangular shape, only coordinate information (xy coordinates) on two vertices of the region of interest R that are diagonally opposite to one another (opposite vertices) on the moving image needs to be stored. The control unit 21 of the reception terminal 20 transfers the information about the region of interest R obtained in this manner through the communication unit 23 to the transmission terminal 10. As mentioned above, this information about the region of interest R is to be used in processing by the image processing unit 11b in the control unit 11 of the transmission terminal 10.

The storage unit 22 of the reception terminal 20 is an element for storing information to be used in the computing process and the like by the control unit 21 and storing a result of the computation. A storage function of the storage unit 22 can be implemented by, for example, a nonvolatile memory such as an HDD or an SSD. The storage unit 22 may have a function as a main memory for writing or reading an interim result and the like of the computing process by the control unit 11. A memory function of the storage unit 22 can be implemented by a volatile memory such as a RAM or a DRAM.

The communication unit 13 of the reception terminal 20 is an element for communicating with the reception terminal 20 and the cloud server 30. A communications system of the communication unit 13 may be either wired or wireless. For example, the reception terminal 20 may be capable of being connected to the Internet in a wired manner through a fiber-optic line or a telephone line or may be capable of being connected to the Internet on a wireless LAN system such as Wi-Fi (registered trademark).

The display unit 24 of the reception terminal 20 is an element for displaying an image. In the system according to the present invention, the display unit 24 displays mainly a moving image received from the transmission terminal 10. As the display unit 24, a known display such as a liquid crystal display or an organic electro-luminescence display can be used. The display unit 24 may be a projector that projects image light onto a screen.

The operation unit 25 of the reception terminal 20 is an element for inputting predetermined operational information into the reception terminal 20 (particularly, the control unit 21) by the user (the supporter). As the operation unit 25, a known device such as a touch panel, a mouse, a keyboard, a track pad, a stylus pen, or a pen tablet can be used. A touch panel display can be formed by placing a touch panel on the display screen.

The sound collection unit 26 of the reception terminal 20 is an element for mainly obtaining voice of the user (the supporter). As the sound collection unit 26, a directional or omnidirectional microphone can be adopted. As the microphone, a known microphone such as a dynamic microphone, a capacitor microphone, or a MEMS microphone can be adopted. In the present embodiment, a voice signal obtained by the sound collection unit 26 of the reception terminal 20 can be transmitted to the transmission terminal 10 through the communication unit 23 over the Internet. This causes the voice of the supporter to be output from the transmission terminal 10 of the worker working on-site.

The sound emission unit 27 of the reception terminal 20 is an element for mainly outputting voice received from the transmission terminal 10. As the sound emission unit 27, a common speaker, earphones, or headphones that transfer sound through aerial vibrations can be adopted. In the present embodiment, a sound signal input into the transmission terminal 10 is transmitted to the reception terminal 20 over the Internet. The reception terminal 20 uses the sound emission unit 27 to convert the sound signal received from the transmission terminal 10 into sound and output the sound. This enables sound obtained by the transmission terminal 10 to be delivered to the supporter operating the reception terminal 20.

The cloud server 30 provides the transmission terminal 10 and the reception terminal 20 with a video calling tool for a Web conversation or the like. The cloud server 30 includes one or more server devices 31. For example, when a communication connection between the transmission terminal 10 and the reception terminal 20 is to be established, the cloud server 30 requires users of the transmission terminal 10 and the reception terminal 20 (the worker and the supporter) to log in using their accounts of the video calling tool. On each of the transmission terminal 10 and the reception terminal 20, a dedicated application program for the video calling tool has been installed. The transmission terminal 10 and the reception terminal 20 each execute this program to access the cloud server 30 and log in using their own accounts. When the transmission terminal 10 and the reception terminal 20 succeed in login authentication, the cloud server 30 starts relaying transmission/reception of image data and sound data between the transmission terminal 10 and reception terminal 20. As the video calling tool, a commonly available off-the-shelf tool can be used as appropriate.

Figure 6:
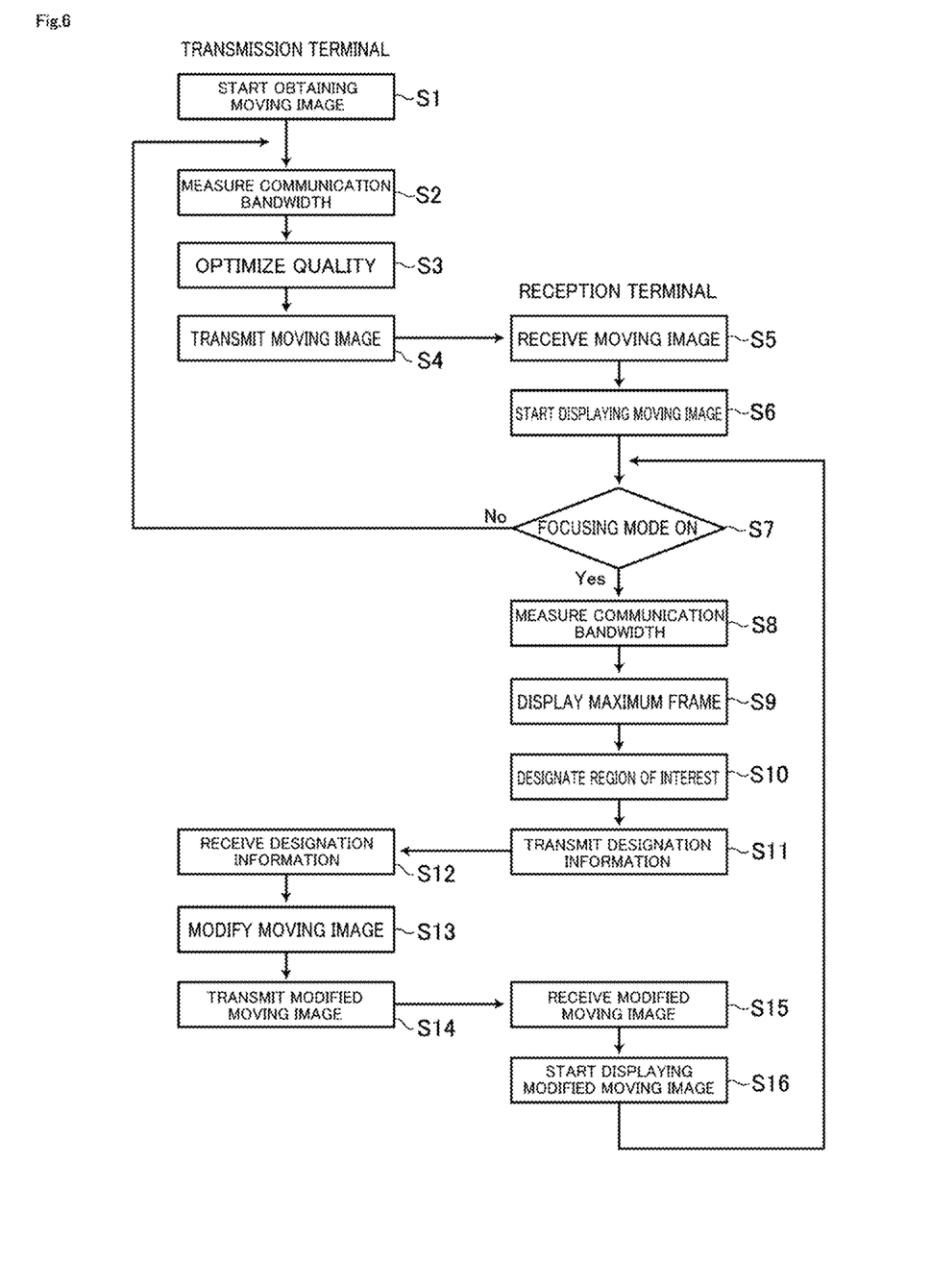
FIG. 6 illustrates a flowchart of a process executed by the system according to the embodiment of the present invention.

Subsequently, with reference to FIG. 6, a flow of a process of transmitting a moving image from the transmission terminal 10 to the reception terminal 20 will be described.

First, the transmission terminal 10 activates the image capture unit 15 and starts obtaining a moving image (step S1). In the present embodiment, it is assumed that the moving image obtained by the transmission terminal 10 is transmitted to the reception terminal 20 in real time. Therefore, the transmission terminal 10 thereafter continues obtaining the moving image.

Next, the bandwidth measurement unit 11a of the transmission terminal 10 measures a bandwidth of a communication link to transmit the moving image to the reception terminal 20 (step S2).

Next, the image processing unit 11b of the transmission terminal 10 optimizes a quality of a raw moving image obtained by the image capture unit 15 in accordance with the bandwidth measured by the bandwidth measurement unit 11a (step S3). Since the bandwidth generally has a limitation, it is difficult to transmit the raw moving image to the reception terminal 20 in an original quality of the raw moving image. Therefore, the image processing unit 11b usually performs, on the entire raw moving image, image processing for lowering quality such as lowering its resolution or lowering its frame rate.

Next, the transmission terminal 10 uses the communication unit 13 to transmit the moving image optimized by the image processing unit 11b to the reception terminal 20 over the communication link (step S4). It is preferable that this transmission terminal 10 transmits, in addition to the moving image, meta information about the quality of the raw moving image to the reception terminal 20. This meta information includes the resolution and frame rate of the raw moving image and a data amount of the raw moving image per unit time. The reception terminal 20 uses the communication unit 23 to receive the moving image and the meta information from the transmission terminal 10 (step S5). Note that the moving image and the meta information may be transmitted from the transmission terminal 10 to the reception terminal 20 via the cloud server 30.

Next, the reception terminal 20 starts displaying the moving image received from the transmission terminal 10 on the display unit 24 (step S6). In the present embodiment, it is assumed that the moving image obtained by the transmission terminal 10 is displayed on the display unit 24 of the reception terminal 20 in real time. Therefore, the reception terminal 20 thereafter continues displaying the moving image. Note that, at this stage, the display unit 24 usually displays a moving image whose quality is lowered from the quality of the raw moving image obtained by the image capture unit 15 of the transmission terminal 10.

Next, the control unit 21 of the reception terminal 20 determines whether the user (the supporter) has performed an input operation for starting a focusing mode (step S7). Note that such an input operation is performed via the operation unit 25. When the focusing mode is not started, the transmission terminal 10 is only required to repeat the process thus far (steps S2 to S6) in which the transmission terminal 10 optimizes the moving image in accordance with the bandwidth of the communication link and transmits the optimized moving image to the reception terminal 20. On the other hand, when the focusing mode is started, the flow proceeds to the next step S7.

When the focusing mode is started, the bandwidth measurement unit 21a of the reception terminal 20 measures a bandwidth of a communication link to receive the moving image from the transmission terminal 10 (step S7).

Next, based on the bandwidth measured by the bandwidth measurement unit 21a and the meta information about the quality of the raw moving image received from the transmission terminal 10, the support unit 21b of the reception terminal 20 calculates a maximum area within which the transmission in the original quality of the raw moving image is allowed, and displays a frame F indicating the maximum area (see FIG. 5) on a display screen of the moving image currently displayed (step S9). As mentioned above, the user can freely set a position and a shape of this frame F via the operation unit 25.

Next, the region-of-interest designation unit 21c of the reception terminal 20 accepts designation of a specific region of interest from the user within a range of the frame F displayed by the support unit 21b (step S10). Information about the region of interest designated by the user (coordinate information) is transmitted from the reception terminal 20 to the transmission terminal 10 (step S11). The transmission terminal 10 receives this information about the region of interest from the reception terminal 20 (step S12).

Next, based on the information about the region of interest received from the reception terminal 20, the image processing unit 11b of the transmission terminal 10 modifies the raw moving image captured by the image capture unit 15 (step S13). As mentioned above, the image processing unit 11b may be configured to cut out only the region of interest from the raw moving image while maintaining the quality of the raw moving image. The image processing unit 11b may be configured to maintain a quality of the region of interest at the quality of the raw moving image while lowering a quality of the remaining region in accordance with the bandwidth of the communication link. The transmission terminal 10 transmits the modified moving image obtained in this manner to the reception terminal 20 (step S14). The reception terminal 20 receives the modified moving image from the transmission terminal 10 (step S15).

Next, instead of the moving image displayed thus far on the display unit 24 (step S6), the reception terminal 20 starts displaying the modified moving image received from the transmission terminal 10 (step S16). The process of displaying the modified moving image in which the region of interest designated by the user is focused on (steps S8 to S16) is continued until the focusing mode is terminated (step S7). When the focusing mode is terminated, the flow returns to the process of displaying the moving image entirely optimized that is obtained by the transmission terminal 10 (steps S2 to S6). The process of displaying the moving image thus far is continued until the communication between the transmission terminal 10 and the reception terminal 20 is disconnected, or until capturing by the image capture unit 15 of the transmission terminal 10 is stopped.

Figure 7:
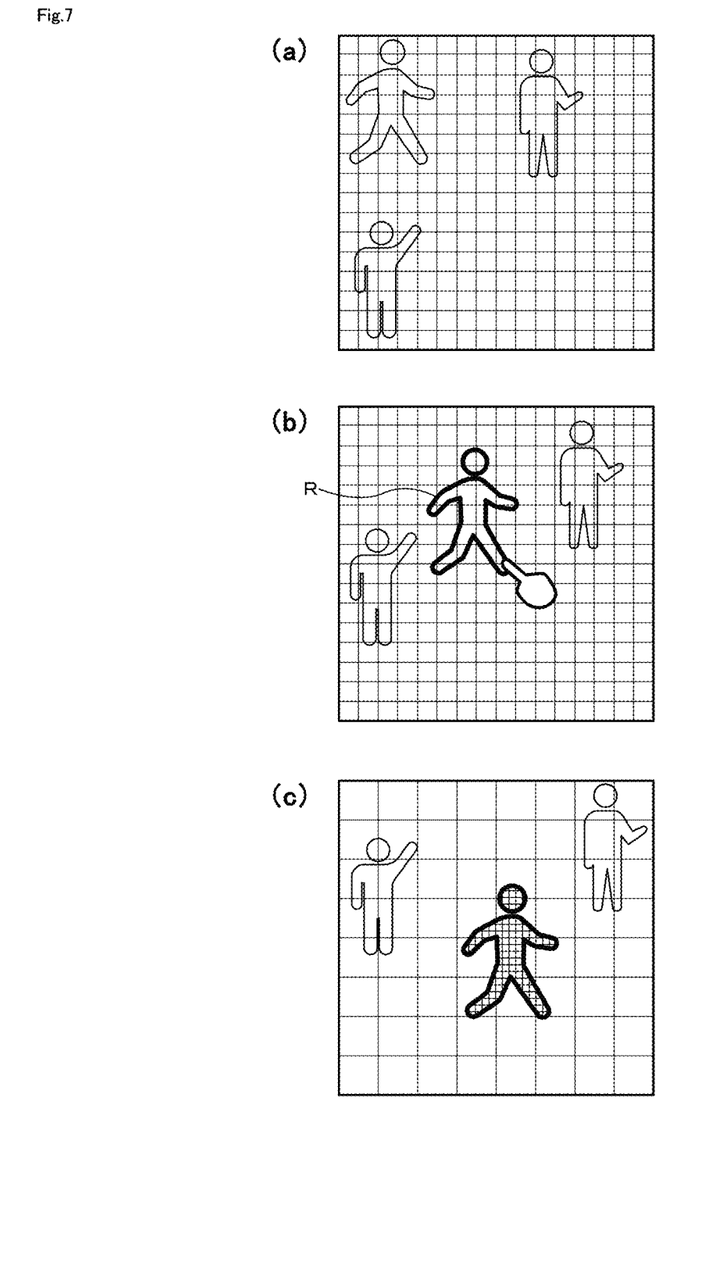
FIG. 7 illustrates another example of a method of designating a region of interest.

FIG. 7 schematically illustrates another example of a method of designating a region of interest. In the above embodiment, a region of interest is designated by the user of the reception terminal 20 (the supporter) designating an arbitrary region in a rectangular shape on a moving image. In contrast, in the example illustrated in FIG. 7, the user designates an object included in the moving image to designate a display region of the object as a region of interest.

To be specific, FIG. 7(a) illustrates a situation in which an image quality of an entire moving image displayed on the reception terminal 20 is made lower than an image quality of the raw moving image obtained by the transmission terminal 10. In the example illustrated in FIG. 7(a), the moving image includes three persons as objects.

Next, FIG. 7(b) illustrates a situation in which one of the objects included in the moving image is designated by the user. In this case, the region-of-interest designation unit 21c of the reception terminal 20 analyzes the moving image to specify, using a known object recognition, a display region of the object designated by the user and specifies the display region of the object as a region of interest R. Information on this region of interest R concerning the designation of the object is transmitted from the reception terminal 20 to the transmission terminal 10. As with the reception terminal 20, the transmission terminal 10 analyzes the raw moving image from the image capture unit 15 to specify, using a known object recognition, the display region of the object designated by the user. The image processing unit 11b of the transmission terminal 10 then maintains a quality of the display region of the object designated as the region of interest R at the original quality of the raw moving image while lowering a resolution or a frame rate of the remaining region in such a manner as to fit a data amount of a resultant modified moving image per unit time to the bandwidth of the communication link. The modified moving image subjected to the image processing in this manner by the image processing unit 11b is transmitted from the transmission terminal 10 to the reception terminal 20.

Next, FIG. 7(c) illustrates a situation in which the reception terminal 20 displays the modified moving image. As illustrated in the drawing, a resolution or frame rate of the raw moving image is maintained for the person designated as the region of interest R, and a quality of the remaining region and the other persons is lowered as a whole. For this reason, the person designated as the region of interest R is displayed on the display unit 24 of the reception terminal 20 in a high resolution and smooth movements. In contrast, a data amount of the remaining region and the other persons is reduced by lowering their image qualities. As a result, a data amount of the entire moving image is reduced, and thus it is possible to transmit the moving image from the transmission terminal 10 to the reception terminal 20 over the communication link while the quality of the person designated as the region of interest R is maintained at a high quality.

Herein, an embodiment according to the present invention has been described above with reference to the accompanying drawings to express details of the present invention. The present invention is, however, not limited to the embodiment described above but includes modifications and improvements obvious to those skilled in the art based on the disclosure provided herein.

REFERENCE SIGNS LIST 10 transmission terminal
11 control unit
11a bandwidth measurement unit
11b image processing unit
12 storage unit
13 communication unit (reception unit, transmission unit)
14 sound collection unit
15 image capture unit
16 gesture sensor
17 sensors
18 sound emission unit
19 positional information obtaining unit
20 reception terminal 21 control unit
21a bandwidth measurement unit
21b support unit
21c region-of-interest designation unit
22 storage unit
23 communication unit (reception unit, transmission unit)
24 display unit
25 operation unit
26 sound collection unit
27 sound emission unit
30 cloud server
31 server device
100 system

The invention claimed is:

1. A moving image transmission system comprising a transmission terminal and a reception terminal that are connected to one another over a communication link, wherein
the transmission terminal includes:
an image capture unit that obtains a moving image; and
a transmission unit that transmits the moving image to the reception terminal,
the reception terminal includes a region-of-interest designation unit that designates a specific region of interest in the moving image, and
the transmission terminal:
further includes an image processing unit that creates a modified moving image that is obtained by performing, based on information about the region of interest, a process of cutting out a moving image in the region of interest from a raw moving image obtained by the image capture unit or a process of lowering a quality of a moving image in a region other than the region of interest from a quality of the raw moving image; and
uses the transmission unit to transmit the modified moving image to the reception terminal;
both or any one of the transmission terminal and the reception terminal further includes a bandwidth measurement unit that measures a bandwidth of the communication link, and
the reception terminal further includes a support unit that provides a user interface supporting designation of the region of interest in accordance with the bandwidth of the communication link, wherein the support unit displays a frame enclosing a maximum area within which transmission in original quality of the raw moving image is allowed in accordance with the bandwidth of the communication link, and allows an operator of the reception terminal to select, within the frame, a portion to be specified as the region of interest.

2. The system according to claim 1, wherein
the reception terminal includes:
a reception unit that receives the moving image from the transmission terminal;
a region-of-interest designation unit that designates a specific region of interest in the moving image; and
a transmission unit that transmits information about the region of interest to the transmission terminal, wherein
the transmission terminal further includes a reception unit that receives the information about the region of interest from the reception terminal.

3. The system according to claim 1, wherein
both or any one of the transmission terminal and the reception terminal further includes a bandwidth measurement unit that measures a bandwidth of the communication link, and
the image processing unit creates the modified moving image in accordance with the bandwidth of the communication link.

4. A method for transmitting a moving image from a transmission terminal to a reception terminal over a communication link, the method comprising:
by the transmission terminal, obtaining a moving image by an image capture unit and transmitting the moving image to the reception terminal;
by the reception terminal, designating a specific region of interest in the moving image;
by the transmission terminal, creating a modified moving image and transmitting the modified moving image to the reception terminal, the modified moving image being obtained by performing, based on information about the region of interest, a process of cutting out a moving image in the region of interest from a raw moving image obtained by the image capture unit or a process of lowering a quality of a moving image in a region other than the region of interest from a quality of the raw moving image;
by both or any one of the transmission terminal and the reception terminal, measuring a bandwidth of the communication link; and
by the reception terminal, providing a user interface supporting designation of the region of interest in accordance with the bandwidth of the communication link, wherein the providing of the user interface includes:
displaying, by the reception terminal, a frame enclosing a maximum area within which transmission in original quality of the raw moving image is allowed in accordance with the bandwidth of the communication link; and
allowing an operator of the reception terminal to select, within the displayed frame, a portion to be specified as the region of interest.

* * * * *